United States Patent [19]
Madsen

[11] Patent Number: 5,289,988
[45] Date of Patent: Mar. 1, 1994

[54] DATA CARTRIDGE WITH SECONDARY TAPE GUIDES

[75] Inventor: David D. Madsen, Lakeland, Minn.

[73] Assignee: Minnesota Mining and Manufacturing Company, St. Paul, Minn.

[21] Appl. No.: 773,453

[22] Filed: Oct. 9, 1991

[51] Int. Cl.$^5$ .............................................. G11B 15/26
[52] U.S. Cl. ................................................... 242/192
[58] Field of Search ............... 242/192, 197, 198, 199, 242/200, 76; 360/132

[56] References Cited
U.S. PATENT DOCUMENTS

| | | | |
|---|---|---|---|
| 3,692,255 | 9/1972 | Von Behren | 242/192 |
| 4,324,372 | 4/1982 | Majicek et al. | 242/192 |
| 4,457,473 | 7/1984 | Mroz et al. | 242/199 X |

*Primary Examiner*—Lenard A. Footland
*Assistant Examiner*—John P. Darling
*Attorney, Agent, or Firm*—Gary L. Griswold; Walter N. Kirn; Charles D. Levine

[57] ABSTRACT

A belt driven reel-to-reel tape cartridge includes two primary tape guides, a guide pin, and two secondary tape guides for guiding the tape to and from respective tape reels. The tape guides and guide pin define a tape guide path between the reels which the extends around the outside of both primary tape guides, both secondary tape guides, and the guide pin.

4 Claims, 1 Drawing Sheet

DATA CARTRIDGE WITH SECONDARY TAPE GUIDES

TECHNICAL FIELD

The present invention is directed to belt driven reel-to-reel data tape cartridge. More particularly, the present invention relates to tape guides for guiding the tape in data tape cartridges.

BACKGROUND OF THE INVENTION

The belt-driven data tape cartridge of von Behren, U.S. Pat. No. 3,692,255 has become a standard interface with computers where rapid acceleration and deceleration of the tape are required. In these reel-to-reel tape cartridges, an elastic driving belt extends along a belt path around corner guide rollers positioned adjacent the tape reels, contacts the tape on the reels, and drives the tape from reel to reel. A tape path extends between the reels and along one edge of the cartridge across a cutaway portion providing access to the tape by a transducer such as a magnetic read/write head which is a part of a tape drive which receives the cartridge.

The tape path is defined by a guide pin, a pair of tape guides, and a pair of tape wrap pins. One tape wrap pin is positioned between each reel and the adjacent tape guide to deflect the tape from a straight line path between the tape supply on the reel and the tape guide. This increases the frictional coupling between the tape and the tape wrap pin as the amount of tape wound on the reel increases and helps to maintain constant tape tension at the magnetic head.

There is a continuing need to further minimize the frictional drive force and to improve tape tracking thereby to further enhance cartridge operation. This can be accomplished by minimizing the friction at the interface between the tape and the tape guides, which accounts for approximately one-third of the drive force in a data cartridge.

SUMMARY OF THE INVENTION

A belt-driven, reel-to-reel magnetic tape data cartridge according to the present invention includes two tape guides on each side of the cutaway portion which serves as the magnetic head opening in the side of the cartridge. Primary tape guides are mounted along the front edge wall of the cartridge and secondary tape guides are mounted between the primary tape guides and the tape reels. This guides and aligns the magnetic tape before the tape passes the read/write head to improve tape tracking.

DETAILED DESCRIPTION OF PREFERRED EMBODIMENTS

Figure 1:
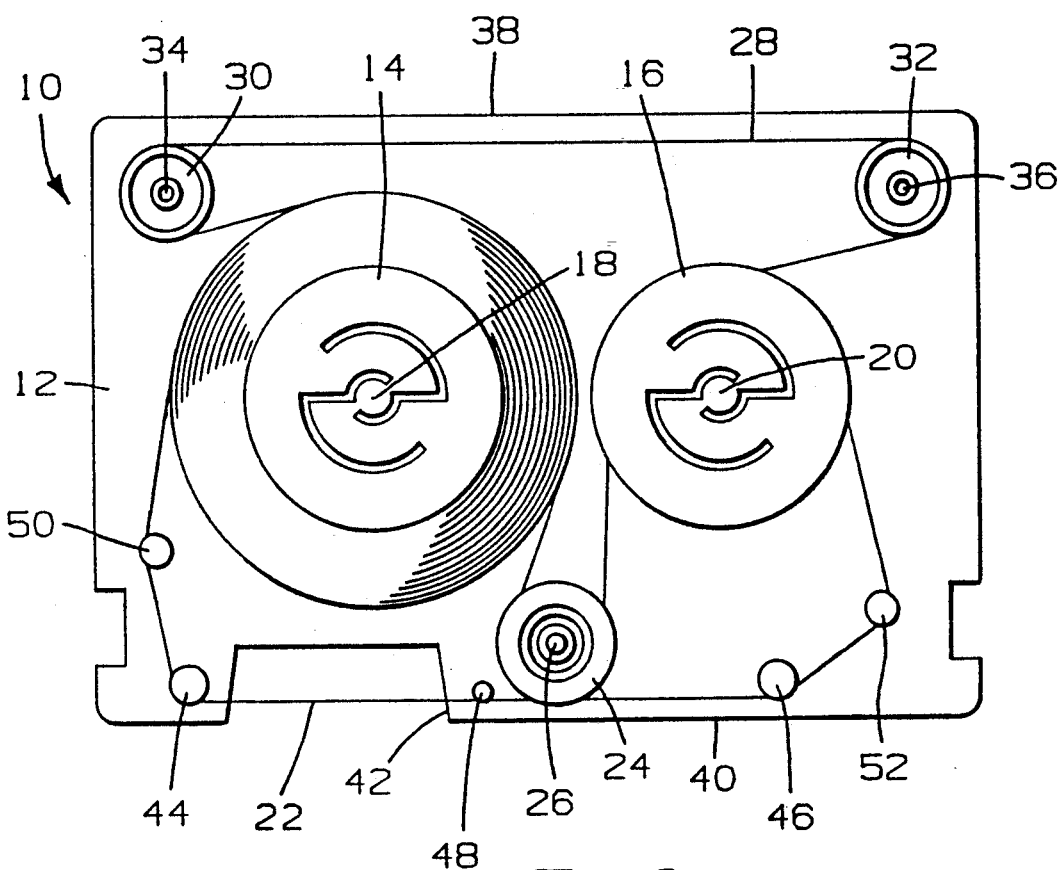
FIG. 1 is a top view of a belt driven data tape cartridge with the cover removed according to the present invention.

The drawings illustrate a data cartridge used in a recording and/or reproducing machine, known as a tape drive (not shown). The tape drive typically includes a support frame including a horizontal cartridge support deck which supports a magnetic transducer or recording head and in a depending manner supports a reversible drive motor. The shaft of the drive motor extends through and carries a drive roller above the support deck. Elongate guides position the cartridge on the support deck. FIG. 1 illustrates a top view of a tape cartridge having four tape guides according to the present invention. The cartridge 10 is a thin generally rectangular enclosure.

As shown in FIG. 1, the cartridge 10 includes a base plate 12 and a cover (not shown). Two tape reels 14, 16 are mounted for rotation on respective tape reel pins 18, 20 within the cartridge 10. The magnetic tape 22 is driven from reel to reel via a drive system including a drive roller 24 which is mounted for free rotation on a drive roller pin 26. The drive roller 24 drives a driving belt 28 which winds around corner guide rollers 30, 32 and the tape reels 14, 16. The guide rollers 30, 32 guide the driving belt 28 and are rotatably mounted on guide roller pivot pins 34, 36 mounted at opposite corners of the cartridge base plate 12 along a back edge wall 38 parallel to the front edge wall 40. The front edge wall 40 has a cutaway portion 42 for access to the magnetic tape 22 by the magnetic recording head. A door (not shown) closes the cutaway portion 42 when the cartridge 10 is not in use. An opening (not shown) extends into the front edge wall 40 to provide access for the drive roller of the tape drive.

The driving belt 28 is thin, continuous, flexible, and elastic. It extends along the belt path around the drive roller 24 and the corner guide rollers 30, 32 and contacts the tape 22 on the tape reels 14, 16. The unstretched length of the driving belt 28 is less than the length of the belt path. Thus, when the belt 28 is stretched around the guide path it generates a belt tension which provides a frictional engagement force or side load between the guide rollers 30, 32 and their respective pivot pins 34, 36 as well as between the belt 28 and the tape reels 14, 16. The frictional engagement force also presses the tape layers together to prevent slippage between the tape layers wound on the tape reels 14, 16 and spilling of the tape 22 from the supply reel. Since the frictional engagement force is dependent on belt tension, the tape tension and drive force are dependent on the belt tension.

The guide rollers 30, 32 are constructed to have a predetermined non-zero coefficient of friction to provide a predetermined frictional coupling between each guide roller 30, 32 and its pivot pin 34, 36. This frictional coupling applies a predetermined frictional drag to the driving belt 28 as it passes around the guide rollers 30, 32 to increase the tension of the belt 28 and provide the proper tension drop between the tape reels 14, 16.

First and second primary tape guides 44 and 46 are also formed on the base plate 12 and guide the magnetic tape 22 to and from respective tape reels 14, 16. A guide pin 48 is disposed on the base plate 12 intermediate the primary tape guides 44, 46 and assists the tape guides 44, 46 in guiding the magnetic tape 22. First and second secondary tape guides 50, 52 are mounted on the base plate 12 adjacent respective primary tape guides 44, 46. The tape guides 44, 46, 50, and 52, and the guide pin 48 make up the tape guide system. Preferably, the secondary tape guides 50, 52 are flanged, as shown in FIG. 1.

The tape 22 is convolutely wound on the tape reels 14, 16 in opposite directions about their axes. A tape guide path between the reels 14, 16 is defined by the primary tape guides 44, 46 and the tape guide pin 48, in addition to the two secondary tape guides 50, 52. The first primary and secondary tape guides 44, 50 are positioned on one side of the cutaway portion 42, with the first primary tape guide 44 residing along the front edge wall 40 of the cartridge 10. The second primary and secondary tape guides 46, 52 and the guide pin 48 are positioned on the opposite side of the cutaway portion 42 with the second primary tape guide 46 and the guide pin 48 residing along the edge wall 40. The tape guide path extends around the outside of both primary tape guides 44, 46, both secondary tape guides 50, 52, and the guide pin 48.

The first secondary tape guide 50 is positioned between the reel 16 and the adjacent first primary tape guide 44, and the second secondary tape guide 52 is positioned between the reel 18 and its adjacent second primary tape guide 26. The secondary tape guides 50, 52 replace the tape wrap pins which are found in known tape cartridges. With tape wrap pins, the tape passes inside of the tape wrap pins to deflect from a straight line between the tape reel and the respective tape guide and to increase this deflection as tape is wound on that reel. In contrast, the secondary tape guides 50, 52 are positioned to cause the tape to pass around them. The distance from the tape guide 44 to the tape guide 50 and the distance from the tape guide 46 to the tape guide 52 are approximately equal. This distance is approximately half the distance from the guide pin 48 to either tape guide 44, 46. This separation distance tends to damp out any tracking variations. The angle from the first and second primary tape guides 44, 46 to the respective first and second secondary tape guides 50, 52 does not affect the improvements.

The secondary tape guides 50, 52 improve the track density and the tape tracking repeatability of the data cartridge 10 by better guiding the magnetic tape across the magnetic head. Thus, the magnetic data tracks are better positioned along the width of the magnetic tape. Additionally, the secondary tape guides 50, 52 more accurately align the tape 22 onto the tape reels 14, 16 before the air under the top layer of the tape 22 on the reel is squeezed out by the driving belt 28. This produces a more precise wind on the reels 14, 16. Furthermore, the secondary tape guides 50, 52 combine with the guides 44, 46 to act as a trough to steer and align the tape 22 before the tape reaches the read/write head to prevent tape wandering, to improve the tape wrap on the reel, and to improve tape tracking. The hub component effects in the tape tracking spectrum are greatly controlled.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, although the cartridge 10 components are discussed as being mounted on the base plate 12, they can be formed in the cover if desired.

I claim:

1. A belt driven reel-to-reel tape cartridge having a belt which is mounted around a drive roller and rotatable guide rollers, the belt contacting the tape reels to drive the tape reels on respective tape reel pins wherein the tape is convolutely wound on the tape reels in opposite directions, the tape cartridge comprising:

a front edge wall which provides access to the tape by a recording head; and a tape guide system comprising:

first and second primary tape guides mounted along the front edge wall for guiding the tape to and from respective tape reels;

a guide pin disposed intermediate the first and second primary tape guides and along the front edge wall for guiding the tape; and a first secondary tape guide mounted between the first primary tape guide and its respective tape reel, wherein the tape guides and guide pin define a tape guide path between the reels and wherein the tape guide path extends around the outside of both primary tape guides, the secondary tape guide, and the guide pin, and wherein the distance between the first secondary tape guide and the first primary tape guide is half the distance between the first primary tape guide and the guide pin to help minimize tape tracking variations.

2. The tape cartridge of claim 1 wherein the tape guide system further comprises a second secondary tape guides mounted between the second primary tape guide and its respective tape reel, wherein the tape guides and guide pin define a tape guide path between the reels and wherein the tape guide path extends around the outside of both primary tape guides, both secondary tape guides, and the guide pin, and wherein the distance between the second secondary tape guide and the second primary tape guide is half the distance between the second primary tape guide and the guide pin to help minimize tape tracking variations.

3. The tape cartridge of claim 2 wherein the cartridge has a cutaway portion along a portion of its front edge wall, the primary tape guides and guide pin are positioned along the front edge wall, and the first primary tape guide and the first secondary tape guide are positioned on one side of the cutaway portion and the second primary tape guide, the second secondary tape guide, and the guide pin are positioned on the opposite side of the cutaway portion.

4. A belt driven reel-to-reel tape cartridge having a belt which is mounted around a drive roller and rotatable guide rollers, the belt contacting the tape reels to drive the tape reels on respective tape reel pins wherein the tape is convolutely wound on the tape reels in opposite directions, the tape cartridge comprising:

a front edge wall which provides access to the tape by a recording head; and a tape guide system comprising:

first and second primary tape guides mounted along the front edge wall for guiding the tape to and from respective tape reels;

a guide pin disposed intermediate the first and second primary tape guides and along the front edge wall for guiding the tape; and a secondary tape guide mounted between the second primary tape guide and its respective tape reel, wherein the tape guides and guide pin define a tape guide path between the reels and wherein the tape guide path extends around the outside of both primary tape guides, the secondary tape guide, and the guide pin, and wherein the distance between the second secondary tape guide and the second primary tape guide is half the distance between the second primary tape guide and the guide pin to help minimize tape tracking variations.

* * * * *